May 5, 1942.                    H. G. BUSIGNIES                        2,282,030
                            SYSTEM OF GUIDING VEHICLES
                               Filed Sept. 1, 1938                 4 Sheets-Sheet 1
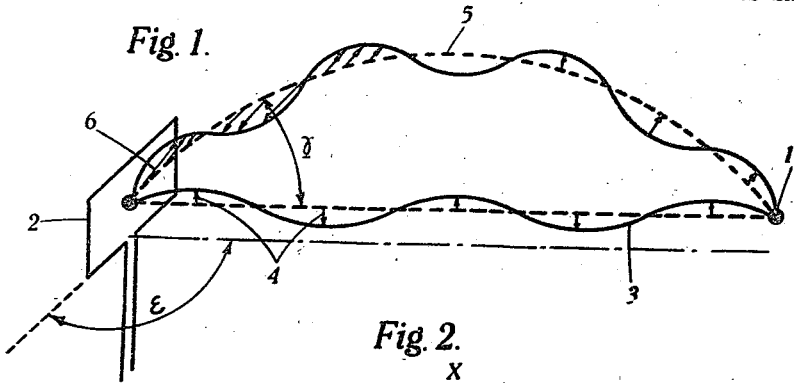
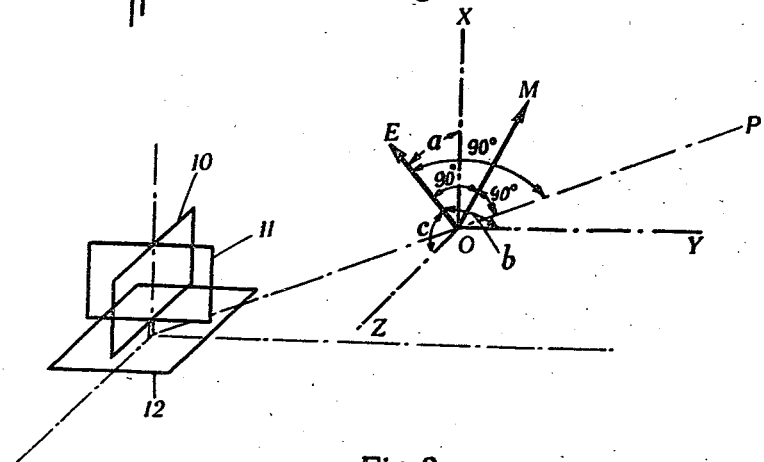
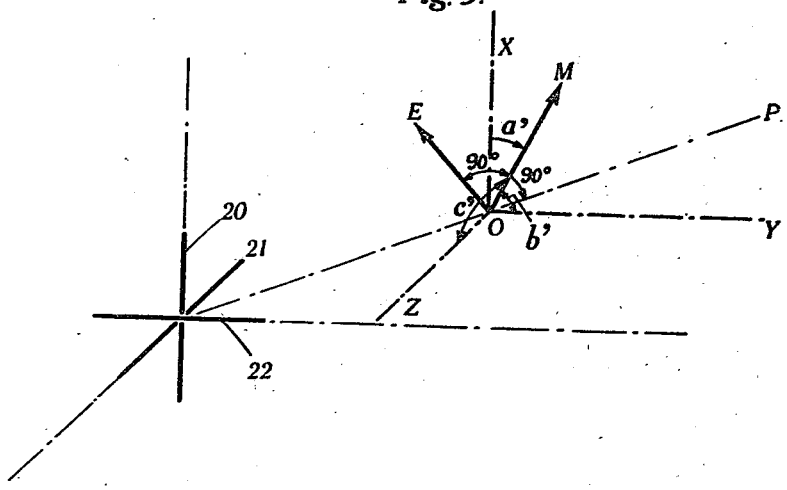
INVENTOR
H. G. BUSIGNIES
BY
ATTORNEY

INVENTOR
H. G. BUSIGNIES
BY
ATTORNEY

May 5, 1942.  H. G. BUSIGNIES  2,282,030
SYSTEM OF GUIDING VEHICLES
Filed Sept. 1, 1938  4 Sheets-Sheet 3
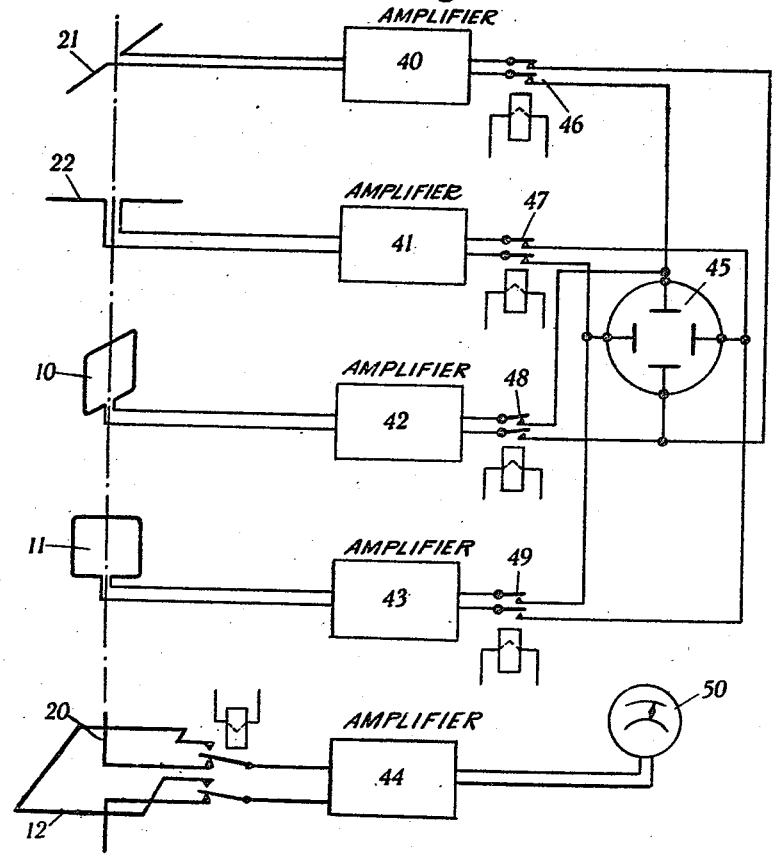
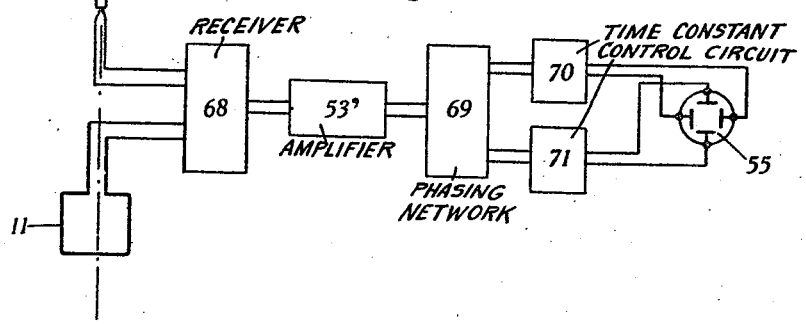
INVENTOR
H. G. BUSIGNIES
BY
ATTORNEY

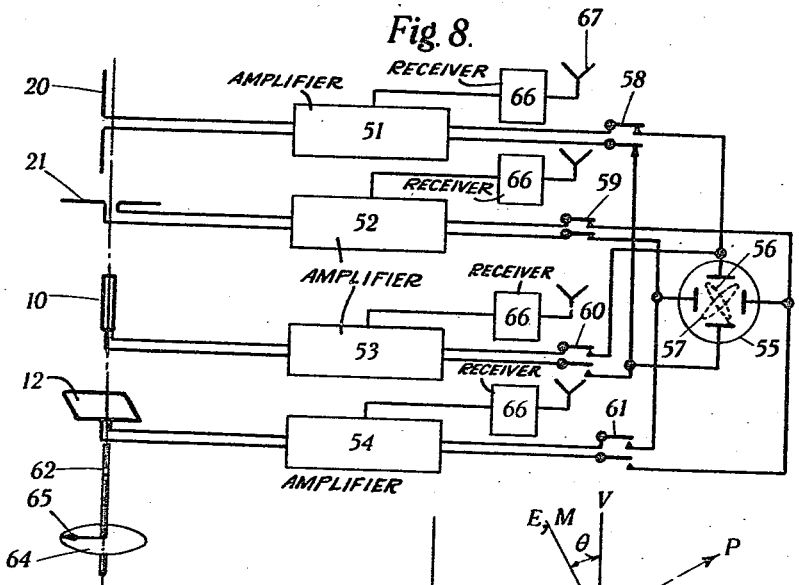
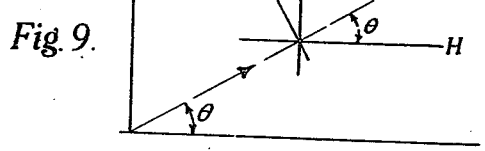
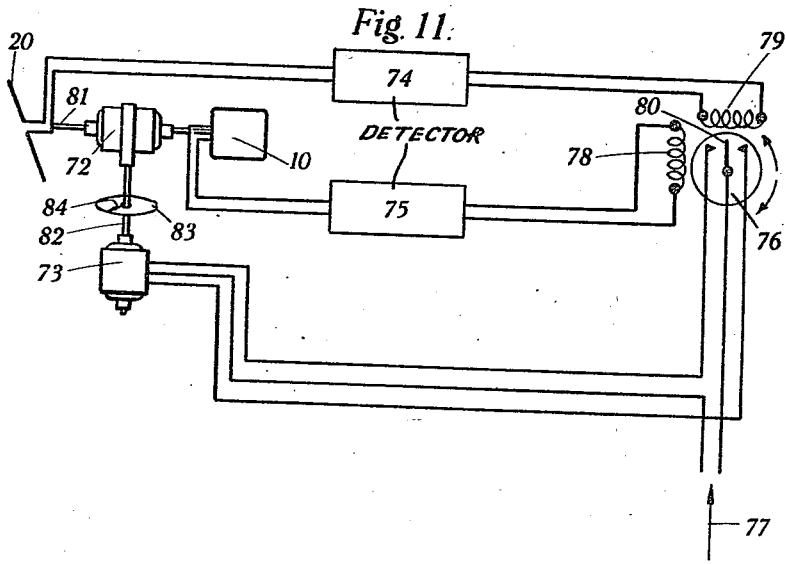

Patented May 5, 1942

2,282,030

UNITED STATES PATENT OFFICE 2,282,030

SYSTEM OF GUIDING VEHICLES

Henri Gaston Busignies, Paris, France, assignor to International Standard Electric Corporation, New York, N. Y.

Application September 1, 1938, Serial No. 227,991
In France September 17, 1937

2 Claims. (Cl. 250—11)

The present invention relates to systems of guiding moving vehicles by means of wireless waves, and more particularly to radiogoniometry systems in which a receiver, such as a wave collector, indicates with respect to a distant transmitter, the desired indications, for example, the absolute direction of said transmitter.

In the operation of such a system, a wave collector of the frame type deriving by signal extinction or signal minimum, the indication of the desired direction, is influenced by certain physical phenomena or material arrangements which considerably disturb and distort to an appreciable extent the quality of the indications supplied. One of these causes of error is known by the name of "night effect," and another by the name of "aircraft error." Their nature will be specified hereinafter.

The principal object of the invention is to provide a method and apparatus for reducing or practically eliminating such errors in radiogoniometrical or wireless guiding systems.

Another object of the invention is to provide simple devices requiring little space for the reception of directional waves.

The invention will be described in detail in the following description, with reference to the attached drawings, in which:

Fig. 1 is a diagram for explaining certain causes of errors in radiogoniometrical reception;

Figs. 2 and 3 represent diagrammatically means of determining, on reception, the direction as determined by the loop antennae and doublet antennae, respectively;

Figure 4:
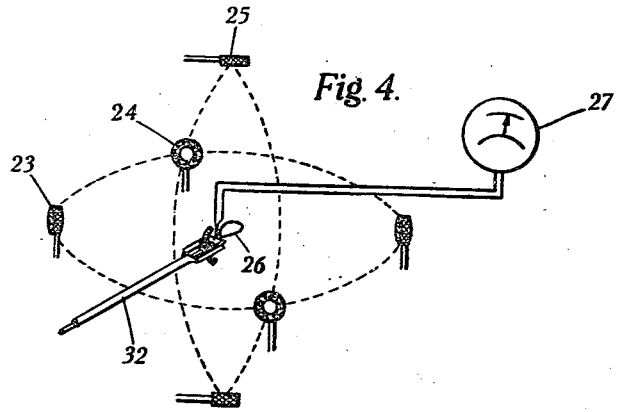

Figs. 4, 5, 5A, and 6 represent an embodiment incorporating features of the invention;

Fig. 7 shows an embodiment utilising a cathode ray tube indicator;

Fig. 8 shows another embodiment utilising a cathode ray tube;

Fig. 9 is an explanatory diagram relating to Fig. 8;

Fig. 10 shows a modification of the embodiment of Fig. 8; and

Fig. 11 represents a specific embodiment adapted to give automatically the desired direction.

The "night effect" or nocturnal error in a radiogoniometer of the frame type is characterised by a rapid or slow displacement of the extinction or minimum direction, the clear extinction being then frequently transformed into a blurred minimum. It appears that this error arises from reflection of the waves at the ionosphere, or more exactly, from a considerable increase in the reflection of the medium length waves ordinarily employed in radiogoniometry, which pass in the daytime without appreciable reflection through the ionised layer of the atmosphere but are there reflected at night in consequence of the increased ionic density of the ionised layer. The effect of said reflection is indicated in Fig. 1, in which a transmitter 1 and a frame aerial 2 are assumed to be in operation. The direct wave, the trajectory of which is represented by 3, arrives at the frame aerial 2 with its electric field vertical as shown by 4. The reflected wave which has followed the trajectory 5 and undergone a change of polarisation, arrives at the frame aerial with its electric field horizontal, as indicated by 6, or very much inclined relatively to the vertical. In addition, the direction of propagation of said indirect wave is inclined, instead of being horizontal. These simultaneous inclinations of the indirect electric field and of the direction of propagation give rise to a considerable error, because the frame aerial, directed as shown in the figure, so as not to receive the direct vertical electric field wave (i. e. electric field at right-angles to the direction of propagation of said wave), receives the reflected wave with horizontal electric field.

If $e$ be the angle of the frame aerial with the direction of the direct wave, and $\gamma$ the angle between the directions of the direct and reflected waves, the electromotive force induced in the frame aerial is $K \cos \epsilon$ for the direct wave and $k \sin \epsilon \sin \gamma$ for the indirect wave where $K$ and $k$ are constants. The total electromotive force $E$ is then given by:

$$E = K \cos \epsilon + k \sin \epsilon \sin \gamma$$

and for a zero induced electromotive force, we have:

$$\tan \epsilon = \frac{K}{k \sin \gamma}$$

The error made will then be $Z = 90° - \epsilon$, and, taking the ratio of the coefficients $K/k$ as equal to 2 and the angle $\gamma$ as equal to 30°, it is found that $\epsilon$ is equal to $-76°$ and the error $Z$ is equal to 14°, and therefore very considerable.

This value of the error has been calculated by assuming the electric fields from the direct and reflected wave to be in phase. If, on the other hand—and this is usually the case—the two fields arrive with any relative phase, a clear minimum is no longer obtained but a very blurred minimum and, sometimes, for one turn of the frame aerial, the variations in intensity noted are sufficiently weak to give the impression of constant reception.

Furthermore, if the frame aerial is located above a bad conducting earth, the reflection effects from the ground are aded to the reflected waves from the ionosphere and the reception of the direct and reflected waves become still more complex as regards phases and directions.

This night error may be reduced to a certain extent when receiving by means of a frame aerial, by suitably arranging the transmitting aerial so that it does not radiate towards the ionosphere.

Wave collectors having no horizontal components or parts are also known, such as Adcock wave collectors, comprising essentially spaced vertically antennae, but these collectors can be used only for terrestrial installations in consequence of their size and the spaces between the elementary antennae which must be of the order of one tenth of the wavelength to be received.

According to certain of its features, the present invention consequently provides receiving means of small size, capable of being mounted on board moving vehicles, and freed of all night error and also of the error ordinarily designated by the name "aircraft error." This aircraft error is due to the fact that the aircraft generally transmits with a suspended aerial, which creates a substantial horizontal electric field component on reception, and that in addition the direction of propagation is inclined relatively to the earth in consequence of the altitude of the aircraft. This error is substantially eliminated in the wave collectors of the Adcock type.

Certain devices for the study of the ionosphere provide special transmissions of impulses enabling, on reception by frame aerial, the impulses which follow the surface of the earth to be separated by means of an oscillograph from the reflections produced by the ionosphere.

By measuring the direction of the direct impulse, it is thus possible to avoid the effects of the reflections of waves by the ionosphere.

These systems present the disadvantage of utilising only the direct wave and their range, for an equal transmitted power, is therefore considerably lower than that of Adcock collectors, which utilise the indirect wave without error due to its different inclinations, because the Adcock collector measures the direction of the projection on the horizontal plane of the direction of propagation.

Now, in the majority of cases, the direction of indirect propagation is contained in the vertical plane passing through the receiver and the transmitter.

Systems utilising impulses and frame aerial reception do not correct the aircraft error, the direct impulses arriving at the aircraft with a simultaneous inclination of their direction of propagation and the direction of the electric field.

In the devices incorporating features of the present invention, the radiogoniometry, without the parasitic effects mentioned hereinbefore, may be effected by the combined direct and indirect wave and therefore benefits are obtained from the increased range due to the ability to make use of the indirect wave in radiogoniometry.

In accordance with certain features, radiogoniometrical reception devices in which nocturnal error and aircraft error are eliminated may employ the three fixed frames shown in Fig. 2 and the three doublet fixed antennae 20, 21, 22 shown in Fig. 3. The three frame aerials 10, 11, 12 are fixed, but may also represent the three successive positions of a single frame aerial disposed accordingly. The axes OX, OY, OZ are respectively parallel to the frame aerials 10, 11, 12, and are assumed as being taken at any point O in space on a direction of propagation of an electromagnetic wave, the electric field component of which at said point O is indicated by E, and the magnetic field component by M.

By denoting by $a$, $b$ and $c$ the three angles formed by the vector E with the three axes, the reception in the three antennae parallel to the axes will be proportional to:

$$E \cos a$$
$$E \cos b$$
$$E \cos c$$

If $a'$, $b'$, $c'$ be the three angles between the vector M and the planes $$Z O Y$$
$$X O Y$$
$$X O Z$$

the reception in the three frame aerials parallel to the planes will be proportional to:

$$M \sin a'$$
$$M \sin b'$$
$$M \sin c'$$

The absolute direction as indicated by the frames may therefore be determined by comparing the intensities of reception in the three frame aerials 10, 11, 12, or the successive intensity of receptions in the single movable frame aerial. The direction of the electric field vector is perfectly determined by means of three doublet fixed antennae 20, 21, 22. Instead of three antennae, it is also possible to employ a single doublet antenna which is made to assume successively the three positions indicated.

As the directions indicated by these systems are at right angles, the direction of propagation P of the wave is determined exactly. Knowing the horizontal plane, the projection on said plane of the direction of propagation will likewise be known, as desired.

If two or more electromagnetic fields of the same frequency emanating from the same transmitter and having their directions of propagation in a vertical plane are in phase in the small space where the antennae and the frame aerials are located, the composition of the vectors will give a direction of propagation contained in the aforesaid vertical plane, and therefore without error.

If said fields are not in phase, which is the most general case, the composition of the ellipses of polarisation will supply equally well a direction of the resulting propagation contained in the vertical plane already mentioned.

Various means of obtaining the direction of propagation in the manner outlined above will now be described by way of non-limitative examples of execution incorporating features of the invention.

If the various components of the waves are received separately in magnitudes and signs by the three frame aerials 10, 11 and 12 and the three antennae 20, 21 and 22 of Figs. 2 and 3, the six readings may be combined by means of a calculating apparatus in order to obtain their vectorial resultant the direction of which coincides with the desired direction of propagation. The apparatus required to perform this operation therefore comprises the three doublet antennae, the three frame aerials, six amplifiers connected to the six receiving components, six visual indicators at the output of the amplifiers, and a calculating apparatus which may, if desired, be specially provided for the calculation required, and on which are manually registered the six indications read in magnitudes and signs on the indicating apparatus. If the calculating apparatus is not specially provided for giving the direction of the vectorial product that is desired, an auxiliary table of results will also be necessary.

Another means, likewise utilising the three frame aerials and the three antennae, consists of separately seeking the direction indicated by the loops, then the direction indicated by the doublets, and combining the two indications by means of a special table. This finding of the direction indications may be carried out by receiving the three components of one of the waves in three pairs of coils 23, 24, and 25, disposed as indicated in Fig. 4, in accordance with three orthogonal axes, a small coil or winding or conductor ring 26, mounted so as to be able to take practically all the inclinations, being disposed in the centre of the whole arrangement of the six coils traversed by the currents of components received from the collector elements. By finding the maximum or the minimum of flux collected by the small auxiliary coil 26, preferably manually, by connecting a visual indicator such as a measuring apparatus 27 to said coil, a first direct indication of one of the direction indications will be obtained; a similar operation will give the other direction indication and these two indications combined, for example, by means of a table, will give the direction of propagation desired. It is clear that the two manual findings may be carried out by means of the same pairs of windings successively switched over to one or the other collector system, or with two separate arrangements.

Figure 5:
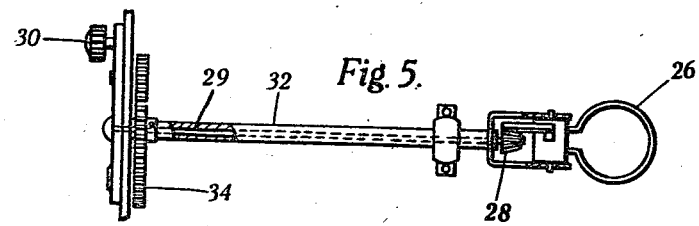
Figure 5A:
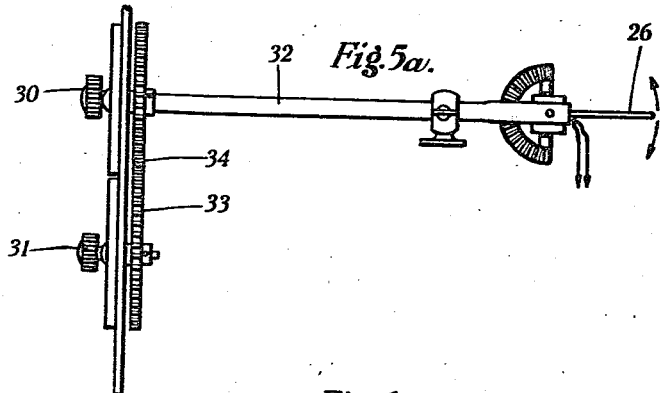
Figure 6:
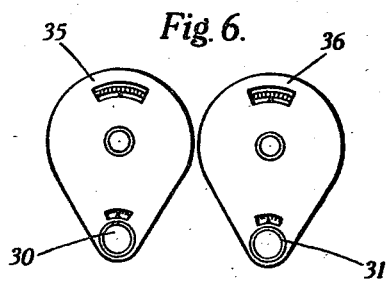

Figs. 5 and 6 represent an embodiment of manual control for the exploration coil 26. The coil is supported in a Cardan joint the gear 28 of which, controlled by the rod 29 and the operating knob 30, rotates the coil 26 about a vertical axis, the rotation of the coil about a horizontal axis being obtained by an operating knob 31 and a hollow rod 32 surrounding the rod 29 and geared to the operating knob 31 by means of gears 33, 34. The two rotations are measured on the separate dials of two indicators 35 and 36, giving the angular displacements, when the measuring apparatus for the current 27 is at zero. This device is given only by way of example, and numerous other arrangements may be utilised.

Still another method of obtaining the direction of propagation consists in manually carrying out two successive operations on one antenna, a loop, for example, and turning the whole of the frame aerial arrangement so as to cancel all reception in one of the frame aerials, for example, the horizontal one, which gives the real direction as indicated by the loop in space. Then, a doublet antenna is displaced around its centre so as to obtain a maximum or minimum reception on this antenna. The manual combination of these two indications, for example, by means of a table, will give the direction of propagation.

Another embodiment of the invention is illustrated in Fig. 7. It consists of three antennae and three frame aerials, the outputs from the wave collectors being suitably grouped at the output of high frequency amplifiers for application to the deflecting plates of a cathode ray tube or equivalent members of other goniometric apparatus. The antennae 21 and 22 may, for example, through the medium of amplifiers 40 and 41, feed the pairs of deflecting plates of an apparatus such as a cathode ray oscillograph 45, and the vertical frame aerials 10 and 11 may, through the intermediary of amplifiers 42 and 43, likewise feed the deflector plates of a cathode ray oscillograph or of the same oscillograph, relay contacts 46, 47, 48 and 49 serving to switch over the connections of the antenna and frame aerials. On the screen of said oscillograph will consequently appear indications relative to the horizontal components of the two direction vectors.

These indications give the directions of the resultant vectors on the horizontal plane of the planes obtained by the loop and doublets respectively. As these two component vectors are perpendicular in space, their directions could be represented on the vertical planes, the traces of which are indicated on the oscillograph, by any two perpendicular straight lines, which would supply an infinity of solutions for the direction of propagation orthogonal to said two vectors. It will consequently be necessary to determine in precise fashion the magnitude of the component received fields on the vertical line, that is to say, either to connect successively the horizontal frame aerial 12 and the vertical antenna 20 successively to an amplifier 44 which is connected to an indicating apparatus such as a measuring apparatus 50, or to connect them separately to two amplifiers connected to different measuring instruments. The combination of the four indications obtained may be made by reference to tables, for example, or by any other appropriate manual methods.

It is clear that other indicating devices, besides a cathode ray oscillograph, could be employed in this embodiment of the invention and the embodiments which follow hereinafter.

It is moreover clear that, instead of contemplating projections of vectors on the horizontal plane, they may be projected on any vertical plane, that is to say, all the possible combinations of the two groups of amplifiers and of the indicating instruments contemplated may be effected.

Fig. 8 represents schematically another system for the determination of the direction of propagation of an electromagnetic wave, wherein four collector components only are required, for example, two antenna (one vertical and the other horizontal), and two frame aerials (one vertical and the other horizontal). These four collector members may be mounted on a common mechanical spindle 62 controlled by any automatic or manual means. The antennae 20 and 21 are connected to the amplifiers 51 and 52, which are in turn connected through the intermediary of relay contacts 58 and 59 to two external or internal deflector members of a cathode ray oscillograph, for example. The currents of these antennae will produce on the screen of said oscillograph a substantially ellipsoidal luminous indication 56, that is to say, presenting a substantially definite axis. The frame aerials 10 and 12 will be similarly connected to high frequency amplifiers 53 and 54, connected in turn to the same deflector members of the cathode ray oscillograph by way of relay contacts 60 and 61, but alternately with the connection of the antennae to said oscillograph. An indication 57 will be given on the fluorescent screen, said indication having likewise the form of an ellipse.

The permutation of the connections is made by any suitable well-known means at a rapid rate, for example, from 1/20 to 1/60 sec. The two ellipsoidal indications will thus be successively registered separately on the screen of the oscillograph. The collector members, or more correctly the collector system as a whole composed of the two frame aerials and the two antennae, is carried round by the common mechanical spindle 62 and the two indications will consequently vary in size and in position on the screen, while retaining their relatively narrow ellipsoidal form. Fig. 9 shows that when the axes of said indications are made to coincide by the rotation of the collector system, the direction of propagation will be defined. In fact, referring to Fig. 9, the magnetic and electrical fields are indicated by M and E respectively and the direction of propagation by P. Said direction of propagation P is orthogonal to the directions of the vectors E and M, and therefore to the plane of said vectors. In addition, said direction of propagation is contained in any vertical plane. If, therefore, it is assumed that Fig. 9 is drawn in the vertical plane (plane of the paper), the vectors E and M will be projected on said plane following a common direction which is the tracing of their plane on the vertical plane containing the direction P. The angle of the direction P with the horizontal H, i. e. $\theta$, is found in the angle of the common projection of the vectors E and M with the vertical V. Therefore, on the screen of the oscillograph this angle will be the angle of the axis of the superposed indications with the vertical axis of the screen.

The direction of propagation of the waves in the horizontal plane will be read on the fixed plate 64 which bears a graduation over which is displaced the moving pointer 65 which is integral with the common mechanical axis 62 of the aerial system, when the two ellipsoidal diagrams on the screen of the oscillograph coincide. The ordinary wireless receivers and their antennae for regular signal reception have been denoted by 66 and 67 in Fig. 8.

It is clear that, instead of four amplifier detectors, two only may be utilised in this last method of operation. The two antennae or the two frame aerials may be connected to a single receiver connected to a single amplifier, and circuits with appropriate time constants are inserted in the connections between the amplifier and the deflector plates. Fig. 10 shows schematically such an arrangement, in which the two frame aerials 10 and 11 are connected to a common receiver 68, placed before the common amplifier 53', and circuits with suitable time constants are formed by the components 69—70 and 69—71 for the connection to the indicating apparatus 55.

Automatic indication systems may likewise be provided, and Fig. 11 represents such a non-limitative example, utilising only one frame aerial and one antenna. Said frame aerial 10 and said antenna 20, shown separately but capable of being mounted to form a single unit, are constantly carried around a horizontal axis 81 by a motor 72, the feed supply of which is not shown. Said motor is carried by a support which may in turn rotate around a vertical axis 82 which is rotated by a motor 73 the operation of which will be explained below. On said vertical axis 82 is likewise mounted a pointer 84 above a fixed graduated plate 83. The antenna 20 is connected through an amplifier detector 74 to a winding 79 and the frame aerial 10 is similarly connected through an amplifier detector 75 to a winding 78. These two windings 79 and 78 form part of a rotating field device 76 which is influenced by the difference in phase existing between the currents coming from the antenna and the frame aerial. The said rotating field device comprises a moving contact 80 which is carried round depending on the phases of the antenna and frame aerial currents and, on each movement, reverses the supply current feeding the reversible motor 73, said current being derived from a source of supply, not shown, through conductors 77.

The operation of the device is then as follows: the motor 72 constantly, and preferably regularly, carries round the antenna 20 and the frame aerial 10. The signals picked up by said members are detected and amplified, and transmitted with different phases to the windings 78 and 79, where they act in such a way that the contact 80 of the rotating field device 76 closes on one or the other of the current supply connections of the vertical axis motor 73. Said motor 73 is reversible, that is to say, the direction of rotation depends upon the direction of the flow of current therethrough. As the phases of the currents in the windings 78 and 79 vary constantly, and periodically, the contact 80 periodically reverses the feeding of the motor 73 and as these periods of commutation are of short duration, the direction of rotation of the motor 73 regularly reverses at close intervals, which causes the motor to perform an oscillating movement around a position which indicates the direction of the waves received by the mean position of the pointer 84 on the plate 83.

It is clear that still other devices utilising features of the invention may be provided without departing from the scope of the same. It is likewise clear that any visual or acoustic indicating devices may be combined with the devices represented in the different embodiments given by way of illustration.

What is claimed is:

1. Apparatus for finding the direction of an electromagnetic wave transmission comprising two sets of three antennae, the antennae of one set consisting of frame aerials arranged in three mutually perpendicular planes, the antennae of the other set constituting doublet antennae arranged in three mutually perpendicular planes, current indicating means arranged for connection to the antennae of both said sets to indicate the relative strengths of the currents induced in the antennae for obtaining said direction of transmission, two of said frame aerials being connected each to the deflecting plates of a cathode ray oscillograph and two of said doublet antennae being each connected to a pair of deflecting plates of a cathode ray oscillograph, whereby representation of the resultant direction indications projected on an orthogonal plane is obtained for both antenna sets and means provided for determining the value of the component strengths in the said orthogonal plane so that the said projection of the resultant indications on the orthogonal plane and the strengths in that plane may be compared and the real direction of the transmitting antenna found.

2. Apparatus for finding the direction of an electromagnetic wave transmission comprising two sets of three antennae, the antennae of one set consisting of frame aerials arranged in three mutually perpendicular planes, the antennae of the other set constituting doublet antennae arranged in three mutually perpendicular planes, current indicating means arranged for connection to the antennae of both said sets to indicate the relative strengths of the currents induced in the antennae for obtaining said direction of transmission, means connecting two of said frame aerials each to the deflecting plates of a cathode ray oscillograph and two of said doublets each to a pair of deflecting plates of a cathode ray oscillograph, whereby representation of the resultant vector projected on an orthogonal plane is obtained for both fields, switching means alternately connecting said frame aerials and said doublet antennae to the said deflecting plates, and means determining the value of the component direction indication in said orthogonal plane so that the said projection of the resultant vector on the orthogonal plane and the component in that plane may be compared and the real direction of the transmitting antenna found.

HENRI GASTON BUSIGNIES.